United States Patent [19]

Goldberg

[11] Patent Number: 4,547,004
[45] Date of Patent: Oct. 15, 1985

[54] COUPLING

[75] Inventor: Harold D. Goldberg, Hazelcrest, Ill.

[73] Assignee: Allied Tube & Conduit Corporation, Harvey, Ill.

[21] Appl. No.: 448,434

[22] Filed: Dec. 10, 1982

[51] Int. Cl.[4] ............................................. F16L 19/00
[52] U.S. Cl. ...................................... 285/31; 285/39; 285/388
[58] Field of Search ............... 285/31, 32, 39, 387, 285/388

[56] References Cited

U.S. PATENT DOCUMENTS 1,119,752 12/1914 Goethner et al. .
3,984,130 10/1976 Berger et al. .
4,082,319 4/1978 Berger et al. .
4,258,936 3/1981 Goldberg .

FOREIGN PATENT DOCUMENTS 1904479 8/1970 Fed. Rep. of Germany ...... 285/387
10085 of 1896 United Kingdom .
1537035 12/1978 United Kingdom ............... 285/387

Primary Examiner—Dave W. Arola
Attorney, Agent, or Firm—Fitch, Even, Tabin & Flannery

[57] ABSTRACT

A coupling for connecting substantially identical external threaded ends of tubular conduits and the like in end-to-end relation, the coupling including a first or outer coupling member having an internal chamber and adapted to be threaded onto the threaded end of either of the conduits to be connected, and a second coupling member disposed within the chamber in the outer coupling member and adapted for threaded engagement with the threaded end of either conduit. The first and second coupling members are adapted to be threaded onto a selected one of the conduits in a manner enabling an axial alignment of the conduits by relative lateral movement therebetween after which the outer coupling member is threaded onto the other of the conduits to draw the adjacent ends of the conduits into abutting end-to-end relation.

4 Claims, 3 Drawing Figures

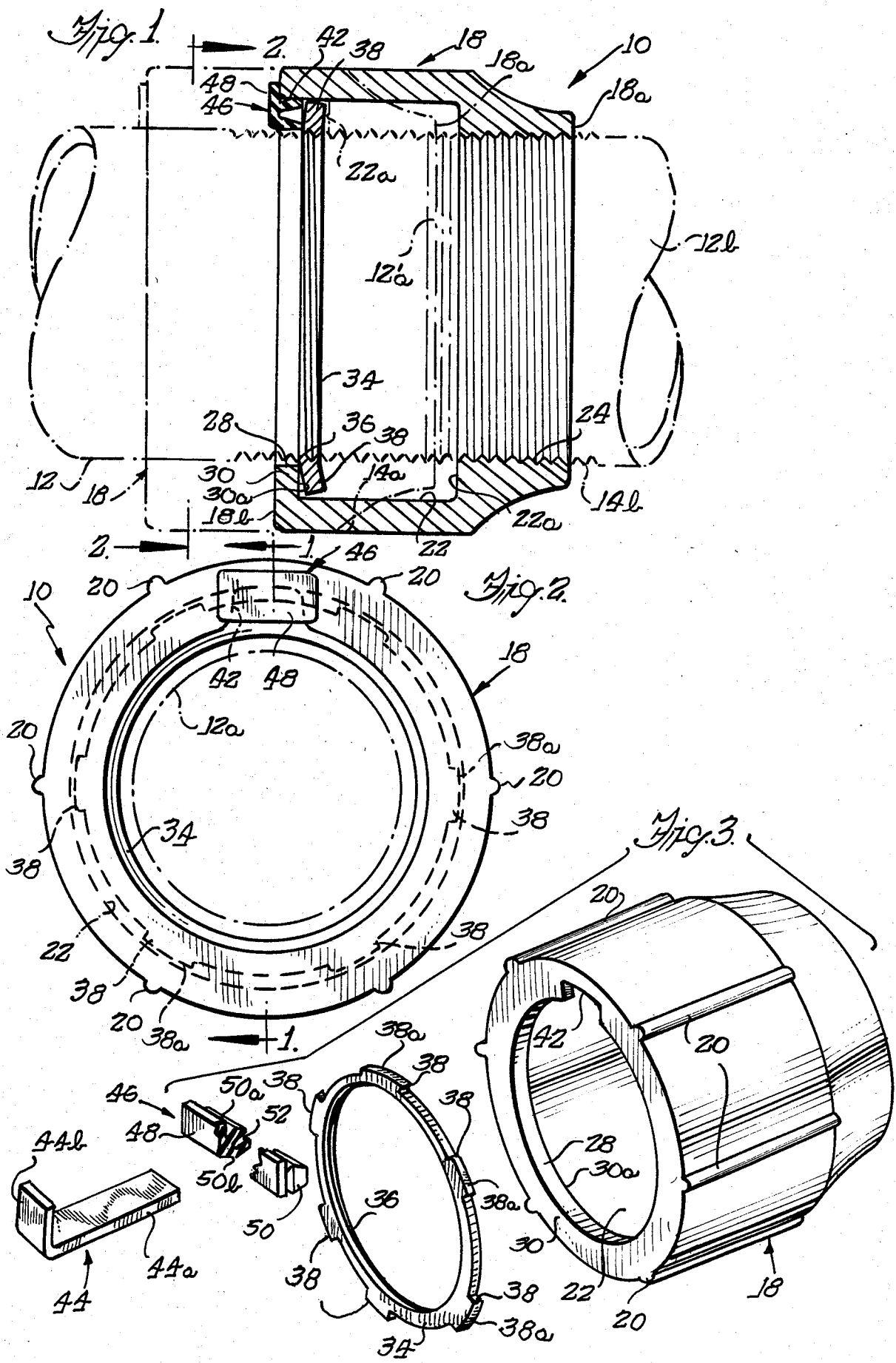

COUPLING

BACKGROUND OF THE INVENTION

The present invention relates generally to couplings for connecting conduit sections or lengths in end-to-end relation, and more particularly to a novel coupling for use in connecting adjacent substantially identical threaded ends of conduit sections in end-to-end relation and which facilitates alignment of the conduit sections by lateral movement therebetween.

It is a conventional practice in many types of pipe or conduit systems, and particularly in electrical systems employing tubular conduits, to connect a number of lengths or sections of conduit in end-to-end relation by means of couplings so as to form a continuous conduit system as necessary for a particular application. In commercial and industrial applications, it is a common practice to employ conduit which conventionally is termed galvanized rigid conduit (GRC) or intermediate metal conduit (IMC). Such conduit is conventionally made in 10 foot lengths and may range up to 2½ inches or greater in outer diameter and may have a wall thickness of 0.100 inch or greater which facilitates forming of external threads on the opposite ends of each length of conduit to enable threaded connection with couplings for connection in end-to-end relation. Both the rigid and intermediate metal conduit sections may be bent into various contours such as 90° els, S-shapes, etc. Due to their relative weight, the rigid and intermediate metal conduit sections are not as readily manipulated during installation as lightweight thin wall type conduit, particularly when employing contoured sections, and are frequently installed in close proximity to a wall or ceiling so that access is relatively limited and rotation and/or longitudinal movement of the individual lengths or sections of conduit during both initial installation and replacement of an intermediate length, may be quite difficult, if not impossible.

One known technique for connecting lengths of rigid pipe or conduit in end-to-end relation is to provide external threads of standard size on the opposite ends of each length or section of conduit and then connect the desired number of conduit lengths in end-to-end relation through couplings having internal threads on opposite ends which enable threaded connection with adjacent ends of conduit sections to form a structurally and electrically sound connection or coupling. A major drawback in this technique is that the prior couplings generally require that they first be threaded onto one coupling section followed by axial alignment of the conduit section with a second conduit section to enable the coupling to be threaded onto the second conduit section. This generally requires relative longitudinal movement between the adjacent conduit sections with simultaneous relative rotation therebetween to effect threaded engagement between the second conduit section and the coupling. Should the need subsequently arise to replace an intermediate section or length of conduit, either a section of the conduit or one or more couplings, or both the conduit and couplings, must be destroyed in order to effect disassembly.

In order to eliminate the aforementioned drawback in prior coupling techniques, attempts have been made to provide couplings for joining lengths of rigid conduit which do not require rotation of the conduit but rather facilitate coupling through rotation of a portion of the coupling while the conduits remain relatively stationary. See, for example, U.S. Pat. No. 1,119,752. A significant drawback with this coupling, however, is that with the coupling installed on the threaded end of a first length of conduit, a second length of conduit must be moved longitudinally into axial alignment with the first conduit in order to receive the connecting portion of the coupling in threaded connection thereon and facilitate drawing of the end of the second conduit into the coupling. As aforementioned, in many installations such relative longitudinal movement between conduit sections is not possible due to space or structural limitations, particularly when replacing an intermediate length of conduit in an existing conduit system.

More recent developments in couplings for rigid and intermediate metal conduits permit the removal of individual intermediate lengths or sections of conduit without axially displacing adjacent conduit sections or disassembling the conduit system from one end to the point where replacement of a section or fitting is required. See, for example, U.S. Pat. Nos. 3,984,130 and 4,082,319. While the couplings disclosed in these two patents enable axial alignment of adjacent ends of conduit sections through relative lateral movement between the conduit sections, the couplings require the forming of a reduced diameter annular recess on one end of each conduit to permit a sleeve portion of the conduit to be retracted axially along the length of the corresponding conduit far enough for the end face of the coupling sleeve to lie flush with the end face of the corresponding conduit. This entails substantially increased manufacturing cost and also requires selective assembly inasmuch as the conduit sections must be assembled with an axially threaded end of one conduit section adjacent a recessed end of the next conduit. Additionally, the coupling must first be assembled onto the recessed end of a conduit section along with a locking ring, thus requiring further selective assembly.

A still further coupling believed to provide significant advances over prior couplings in the connection of threaded ends of conduit sections in end-to-end relation while facilitating relative lateral movement between the conduit sections to establish axial alignment is disclosed is U.S. Pat. No. 4,258,936 dated Mar. 31, 1981. It is this latter type of coupling to which the coupling of the present invention relates.

SUMMARY OF THE INVENTION

One of the primary objects of the present invention is to provide a novel coupling for connecting conduit sections in end-to-end relation and which enables positioning of the conduit sections in axially aligned end-to-end relation through relative lateral movement between the conduit sections.

A more particular object of the present invention is to provide a novel coupling for use in connecting identical threaded ends of conduit sections in end-to-end relation, the coupling being adapted for threaded assembly onto the end of a first conduit section so as to enable lateral movement between the conduit sections to axially aligned positions whereafter the coupling may be threaded onto the second conduit section while the conduit sections remain relatively stationary.

A feature of the coupling in accordance with the present invention lies in the provision of an outer coupling member having a chamber formed therein one end of which is defined by an annular radially inwardly directed flange configured to enable insertion of an annular inner coupling member into the chamber. The outer and inner coupling members are adapted for threaded engagement onto a common threaded end of a first conduit section so as to enable a second conduit section to be moved laterally into axial alignment with the first conduit section after which the outer coupling member may be threaded onto the second conduit section with the radial flange acting against the inner coupling member in a manner to draw the conduit sections into abutting end-to-end relation.

Another feature of the present invention lies in the provision of a slot or recess in the radial flange on the outer coupling member to enable insertion of an annular inner coupling member into the internal chamber in the outer coupling member whereafter the annular flange prevents withdrawal of the inner coupling member when assembled onto the threaded end of a conduit section.

Further objects and advantages of the present invention, together with the organization and manner of operation thereof, will become apparent from the following detailed description of the invention when taken in conjunction with the accompanying drawings wherein like reference numerals designate like elements throughout the several views.

BRIEF DESCRIPTION OF THE DRAWING

FIG. 1 is a longitudinal sectional view of a coupling in accordance with the present invention, taken substantially along line 1—1 of FIG. 2 and illustrating the coupling in assembled relation with a pair of tubular conduits shown in phantom;

FIG. 2 is an end view of the coupling of FIG. 1 taken substantially along line 2—2 of FIG. 1;

FIG. 3 is an exploded perspective view illustrating the various components of the coupling of FIGS. 1 and 2 and a tool which may be utilized in assemblying the coupling onto a conduit.

DESCRIPTION OF PREFERRED EMBODIMENT

Referring now to the drawings, a coupling constructed in accordance with the present invention is indicated generally at 10. The coupling 10 is particularly adapted for connecting two conduit sections or lengths, such as indicated in phantom at 12a and 12b in FIG. 1, in axially aligned end-to-end relation. More particularly, the coupling 10 is adapted for connecting substantially identical size threaded ends of two conduit sections in end-to-end relation in a manner which enables axial alignment of the conduit sections through lateral movement therebetween. This is particularly desirable where it is necessary to replace an intermediate length or section of conduit within a conduit system where longitudinal or rotational movement of the conduit sections is difficult or otherwise physically impractical due to physical restraints or the contour of the conduit sections.

The conduit sections or lengths 12a and 12b are tubular and may comprise metallic or non-metallic conduit generally defined as intermediate or heavy wall conduit on which may be formed indentical right-hand external standard tapered pipe threads at the ends thereof, such as indicated at 14a and 14b, respectively. Other than the forming of suitable external threads on the opposite ends of the conduit sections, the coupling 10 does not require any special preparation of the conduit sections, thus minimizing initial manufacturing costs of the conduit and eliminating the need for subsequent speçial preparation of the conduit sections at the work site.

The coupling 10 includes a first or outer annular coupling member 18 which is preferably made of a suitable metallic material such as cast iron or other suitable alloy which lends itself to casting. The outer coupling member 18 may have a plurality of longitudinal outwardly extending ribs 20 formed in spaced relation about its outer peripheral surface to provide wrench lugs for assembly and disassembly of the coupling 10. The outer coupling member 18 defines an internal chamber 22 which opens outwardly of a forward end 18a of the outer coupling member through an annular internal pipe thread 24 of a size sufficient to enable threaded engagement with either of the identical threaded ends 14a and 14b of the conduit sections 12a,b. The internal chamber 22 also opends outwardly of the rear end 18b of the outer coupling member through a substantially circular opening 28 defined centrally of a radial inwardly directed flange 30 which is preferably formed as an integral part of the outer coupling member, the diameter of the opening 28 being slightly greater than the outer diameter of the conduit sections 12a,b with which the coupling 10 is to be employed. The internal thread 24 defines internal means within the outer coupling member adapted for releasable connection with the threaded end of either of the conduits 12a,b.

The coupling 10 includes a second or inner annular coupling member 34 which is adapted for insertion within the internal chamber 22 and is axially movable within and relative to the outer coupling member 18 between an inner substantially annular transverse surface 30a on the radial flange 30 and a transverse annular surface 22a adjacent internal thread 24 which together establish the longitudinal limits of the recess 22. The inner coupling member 34, which may be termed a conduit locknut, has an internal thread 36 formed therein of a size substantially identical to the internal thread 24 so as to enable threaded connection with either of the threaded ends 14a and 14b of the conduit sections 12a,b. The inner coupling member has a plurality of radially outwardly extending arcuate projections 38 formed thereon which, in the illustrated embodiment, comprise six equidistantly circumferentially spaced projections formed integral with the inner coupling member. As best seen in FIG. 1, the radial projections 38 are angularly inclined to one side of the plane of the inner coupling member and have outer arcuate surfaces 38a which lie on a common diameter slightly less than the diameter of the internal chamber 22 in the outer coupling member 18.

To facilitate insertion of the inner coupling member 34 within the chamber 22 in the outer coupling member 18 and subsequent manipulation of the inner coupling member, a radial generally rectangularly shaped recess or slot 42 is formed in flange 30 of the outer coupling member. As will be hereinafter described, the slot 42 enables entry of a tool, such as indicated at 44 in FIG. 3, into the chamber 22 to facilitate threading of the inner coupling member 34 onto the conduit 12a and subsequent removal therefrom. The diameter of the opening 28 internally of the flange 30 and the radial extent of the recess 42 are selected to enable insertion of the inner coupling member 34 within the chamber 22 by positioning the inner coupling member so that it lies in a plane which is generally normal to the plane of flange 30 and contains a radius of opening 28 which passes generally centrally through the recess 42. This enables the inner coupling member to be partially inserted into the internal chamber 22 after which the inner coupling member may be manipulated for complete insertion into chamber 22 and positioned to lie against the annular surface 22a with the projections 38 inclined toward the internal annular end surface 22a on the outer coupling member.

After connecting or coupling two conduit sections such as 12a,b in end-to-end relation, a plug 46 is preferably inserted into the recess 42 in a manner enabling its release therefrom. The plug 46 is preferably made from a suitable plastic material such as polypropylene which may be color coded to identify its use for a particular size coupling. The plug 46 has a generally planar rectangular portion 48 formed integral with a forwardly extending insert portion 50 having upper and lower surfaces 50a and 50b, respectively, which are formed as upwardly and downwardly facing V-shaped surfaces and between which a recess 52 is formed to provide sufficient resiliency to enable insertion into the recess 42 and frictional retention therein, as illustrated in FIG. 1.

In coupling the threaded ends of two tubular conduits such as 12a and 12b in end-to-end relation, and with the outer coupling member 18 having an inner coupling member 34 disposed within its internal chamber 22, the outer coupling member is placed over the conduit 12a such that the threaded end 14a extends into chamber 22 through opening 28. As aforementioned, the tool 44 may be employed to thread the inner coupling member 34 onto the threaded end 14a and to remove the inner coupling member therefrom. In the illustrated embodiment, tool 44 is made of a suitable metallic material and is formed as an L-shaped tool having a long arm portion 44a and a short arm portion 44b. The tool is sized so that either arm portion 44a or 44b may be inserted through slot 42. The long arm portion 44a is of sufficient length so that with the inner coupling member 34 positioned generally against the annular surface 22a, arm 44a may be inserted through slot 42 and extend between two of the projections 38 on the inner coupling member. With the tool 44 so positioned, rotation of the outer coupling member 18 effects a corresponding rotation of the inner coupling member. Thus, rotation of the outer coupling member in a clockwise direction, as viewed from the end surface 18a, will cause the inner coupling member to be threaded onto the threaded conduit end 14a. The inner and outer coupling members may be threaded onto the threaded end 14a simultaneously until the inner coupling member is fully threaded on the thread 14a and the forward end surface 18a of the outer coupling member is substantially flush or coplanar with the end 12'a of the conduit 12a, as illustrated by the phantom position of the outer conduit in FIG. 1. It will be appreciated that the tool 44 is removed from slot 42 when the inner coupling member is fully threaded onto the threaded end 14a.

With the inner and outer coupling members thus mounted on the conduit section 12a, a second conduit section, such as 12b, may be moved into axial alignment with conduit section 12a by relative lateral movement between the conduit sections without necessitating longitudinal movement of either section. With the conduit sections axially aligned and in end-to-end relation, the outer coupling member 18 is then threaded onto the threaded end 14b of the second conduit 12b until flange 30 engages the inner coupling member 34 after which continued rotation of the outer coupling member onto the conduit 12b serves to draw the ends of the aligned conduits into snug abutting relation. By inclining the projections 38 on the inner coupling member 34 as shown in FIG. 1, rotation of the outer coupling member to thread it onto conduit 12b can be effected without rotating the inner coupling member when engaged by flange 30.

When it is desired to release the conduits 12a,b from each other the outer coupling member 18 is rotated in a direction to release the threaded end 14b of conduit 12b. Assuming a similar coupling at the opposite end of conduit 12a (not shown) connecting the opposite end to a third aligned conduit section, release of both couplings enables removal of section 12a by lateral movement thereof. The outer and inner coupling members may then be removed from the threaded end 14a by again inserting the tool 44 into slot 42 to extend between two of the projections 38 and rotating the outer coupling member in a direction to unthread the inner coupling member. Other types of tools could also be employed in place of tool 44.

Thus, the coupling 10 is adapted to be mounted on one coupling section in a manner to enable positioning of the conduit section in axially aligned relation with another conduit section by effecting relative lateral movement between the conduit sections. This feature of the coupling 10 is particularly desirable in applications where access is relatively limited and relative longitudinal or rotational movement between the adjacent sections of the conduit is difficult, if not impossible. The coupling 10 thereby enables replacement of an intermediate length or section of either straight or contoured conduit in a conduit system without need for disturbance of other conduit sections as by longitudinal or rotational movement thereof.

Another particularly desirable feature of the coupling 10 is that it facilitates disconnection of coupled conduit sections without damaging the coupling or associated conduit sections, thus providing a coupling which is salvageable and reusable.

While a preferred embodiment of the present invention has been illustrated and described, it will be understood to those skilled in the art that changes and modifications may be made therein without departing from the invention in its broader aspects. Various features of the invention are defined in the following claims.

What is claimed is:

1. A coupling assembly for connecting two conduit sections in axially aligned end-to-end relation, said conduit sections having substantially identical external threads formed on the ends thereof which are to be connected in end-to-end relation, said coupling assembly comprising:

an integral annular outer coupling member having a forward end, a rear end and an internal chamber extending between said ends and of sufficient size to freely receive the threaded end of either of said conduit sections therein, said forward end having a generally circular forward opening communicating with said chamber and defined by an internal surface having a pipe thread for engagement with the threads on said conduit ends, said rear end having a radial inwardly directed flange defining a generally circular rear opening aligned with said forward opening, communicating with said chamber and having a diameter greater than the outside diameters of said conduit sections, said forward end having a forward abutment surface facing said chamber and said flange having a rear abutment surface facing said chamber; and an inner annular coupling member disposed within said chamber and axially movable therein, said inner coupling member being captively held between said foward end and said rear end, said inner coupling member having a threaded central opening enabling threaded connection with the threaded end of either of said conduit sections, said inner coupling member further having a plurality of spaced radial projections extending away from said central opening and inclined toward said front end so that said inner coupling member enters into sliding engagement adjacent said threaded central opening with said rear abutment surface, said flange having a recess joining said rear opening and being of sufficient size to enable insertion of said inner coupling member into said chamber by passing said inner coupling member through said rear opening and recess, said coupling assembly further comprising a tool having a generally straight arm extending through said recess and between said projections with said inner coupling engaging said rear abutment surface whereby rotation of said outer coupling member results in rotation of said inner coupling member either to remove the inner coupling member from a conduit section after it has been mounted thereon, or to install said inner coupling member on a conduit section.

2. A coupling assembly as set forth in claim 1 wherein projections are equidistantly circumferentially spaced.

3. The combination of a coupling for connecting two conduit sections in axially aligned end-to-end relation and a tool for use in releasing said coupling from one of said conduit sections, said conduit sections having substantially identical external threads formed on the ends thereof which are to be connected in end-to-end relation, said coupling comprising:

an annular outer coupling member having a forward end, a rear end and an internal chamber extending between said ends and of sufficient size to freely receive the threaded end of either of said conduit sections therein, said forward end having a generally circular forward opening communicating with said chamber and defined by an internal surface having a pipe thread for engagement with the threads on said conduit ends, said rear end carrying a radial inwardly directed flange means defining a generally circular rear opening aligned with said forward opening, communicating with said chamber and having a diameter greater than the outside diameters of said conduit sections, said forward end having a forward abutment surface facing said chamber and said flange means having a rear abutment surface facing said chamber; and an inner annular coupling member disposed within said chamber and axially movable therein, said inner coupling member being captively held between said forward end and said rear end, said inner coupling member having a threaded central opening enabling threaded connection with the threaded end of either of said conduit sections, said inner coupling member having at least one radial projection extending away from said central opening and said inner coupling member being slidably engageable with said rear abutment surface, said flange means having a recess joining said rear opening, said tool including a generally straight arm extending through said recess and engaging said projection whereby rotation of said outer coupling member results in rotation of said inner coupling member to permit removal of the inner coupling member from a conduit section after it has been mounted thereon, or to permit installation of said inner coupling member on a conduit section.

4. The combination as set forth in claim 3 wherein said outer coupling member is integral and includes said flange means.

* * * * *